US012508754B2

(12) United States Patent
Yoshida

(10) Patent No.: US 12,508,754 B2
(45) Date of Patent: Dec. 30, 2025

(54) TRANSFER APPARATUS, RESIN MOLDING APPARATUS, AND METHOD FOR MANUFACTURING RESIN MOLDED PRODUCT

(71) Applicant: TOWA CORPORATION, Kyoto (JP)

(72) Inventor: Syuhei Yoshida, Uji (JP)

(73) Assignee: TOWA CORPORATION (JP)

( * ) Notice: Subject to any disclaimer, the term of this patent is extended or adjusted under 35 U.S.C. 154(b) by 49 days.

(21) Appl. No.: 18/257,216

(22) PCT Filed: Nov. 22, 2021

(86) PCT No.: PCT/JP2021/042824
§ 371 (c)(1),
(2) Date: Jun. 13, 2023

(87) PCT Pub. No.: WO2022/130914
PCT Pub. Date: Jun. 23, 2022

(65) Prior Publication Data
US 2024/0009900 A1 Jan. 11, 2024

(30) Foreign Application Priority Data
Dec. 14, 2020 (JP) .................. 2020-206491

(51) Int. Cl.
*B29C 45/14* (2006.01)
*B29C 45/26* (2006.01)

(52) U.S. Cl.
CPC .. *B29C 45/14008* (2013.01); *B29C 45/14065* (2013.01); *B29C 45/2602* (2013.01)

(58) Field of Classification Search
CPC ........ B29C 45/14008; B29C 45/14065; B29C 45/2602; B29C 33/12; B29C 45/14; B29C 45/02; B29C 45/14639; B29C 45/26; H01L 21/56
See application file for complete search history.

(56) References Cited

FOREIGN PATENT DOCUMENTS

| CN | 1505125 | A |   | 6/2004 |
|----|---------|---|---|--------|
| CN | 105563219 | A |   | 5/2016 |
| CN | 105690653 | A | * | 6/2016 |
| CN | 108481693 | A |   | 9/2018 |
| CN | 109382965 | A |   | 2/2019 |

(Continued)

OTHER PUBLICATIONS

International Search Report dated Feb. 8, 2022 issued for International application No. PCT/JP2021/042824.

(Continued)

*Primary Examiner* — S. Behrooz Ghorishi
(74) *Attorney, Agent, or Firm* — Brooks Kushman P.C.

(57) ABSTRACT

The present invention enables a reference surface member to reliably contact a side surface of a recess of a molding die, and is directed to a conveyance apparatus that conveys an object to be molded to a molding die in which a recess is formed on a side of a mold surface on which the object to be molded is placed, the conveyance apparatus including: a position reference mechanism having a reference surface serving as a positioning reference of the object to be molded placed on the molding die; and an object-to-be-molded moving mechanism that moves the object to be molded placed on the molding die toward the reference surface.

11 Claims, 16 Drawing Sheets

(56) References Cited

FOREIGN PATENT DOCUMENTS

| | | |
|---|---|---|
| CN | 109940792 A | 6/2019 |
| CN | 110815707 A | 2/2020 |
| JP | 2009147188 A | 7/2009 |
| JP | 2013-084709 A | 5/2013 |
| JP | 2015-098372 A | 5/2015 |
| JP | 2016-192500 A | 11/2016 |
| JP | 6164380 B1 | 7/2017 |
| JP | 2019-031051 A | 2/2019 |
| JP | 6655148 B | 2/2020 |
| JP | 2020-064919 A | 4/2020 |
| TW | 202017091 A | 5/2020 |

OTHER PUBLICATIONS

Office Action dated Jul. 8, 2022 issued in TW patent application No. 110144445.
Notice of allowance dated Oct. 28, 2022 issued for TW patent application No. 110144445.
Office Action dated Jun. 17, 2025 issued in CN patent application No. 202180079856.0.

* cited by examiner

TRANSFER APPARATUS, RESIN MOLDING APPARATUS, AND METHOD FOR MANUFACTURING RESIN MOLDED PRODUCT

CROSS-REFERENCE TO RELATED APPLICATIONS

This application is the U.S. national phase of PCT Application No. PCT/JP2021/042824, filed Nov. 22, 2021, which claims priority to Japanese Patent Application No. 2020-206491, filed Dec. 14, 2020, the disclosures of which are incorporated in their entirety by reference herein.

TECHNICAL FIELD

The present invention relates to a conveyance apparatus, a resin molding apparatus, and a method for manufacturing a resin molded product.

BACKGROUND ART

Conventionally, for example, as disclosed in Patent Literature 1, a conveyance apparatus that conveys and positions an object to be molded with respect to a molding die having no positioning pin for positioning the object to be molded is considered.

In this conveyance apparatus, a position defining member serving as a positioning reference of the object to be molded is brought into contact with an inner surface of a recess in which a pot block of a lower molding die is accommodated, and the object to be molded is brought into contact with an end surface of the position defining member to position the object to be molded.

CITATION LIST

Patent Literature

Patent Literature 1: JP 6655148 B2

SUMMARY OF THE INVENTION

Technical Problem

However, in the above configuration, when the position defining member is brought into contact with the inner surface of the recess, it is difficult to position the position defining member in a vertical direction, and the position defining member may not be brought into contact with the inner surface of the recess. Furthermore, in the above configuration, a lower end of the position defining member may come into contact with an upper surface of the pot block to be scratched or damaged.

Therefore, the present invention has been made to solve the above problems, and a main object thereof is to reliably bring a member serving as a positioning reference of an object to be molded into contact with a side surface of a recess formed in a molding die.

Solution to Problem

That is, a conveyance apparatus according to the present invention is a conveyance apparatus that conveys an object to be molded to a molding die in which a recess is formed on a side of a mold surface on which the object to be molded is placed, the conveyance apparatus including: a position reference mechanism having a reference surface serving as a positioning reference of the object to be molded placed on the molding die; and an object-to-be-molded moving mechanism that moves the object to be molded placed on the molding die toward the reference surface, in which the position reference mechanism includes: a reference surface member having the reference surface and provided so as to be contactable with a side surface of the recess; a lift mechanism that comes into contact with a bottom surface of the recess to separate the reference surface member from the bottom surface of the recess; and a reference surface moving mechanism that moves the reference surface member toward a side surface of the recess while the reference surface member is separated from the bottom surface of the recess by the lift mechanism.

Advantageous Effects of Invention

According to the present invention configured as described above, the member serving as the positioning reference of the object to be molded can be reliably brought into contact with the side surface of the recess formed in the molding die.

Figure 1:
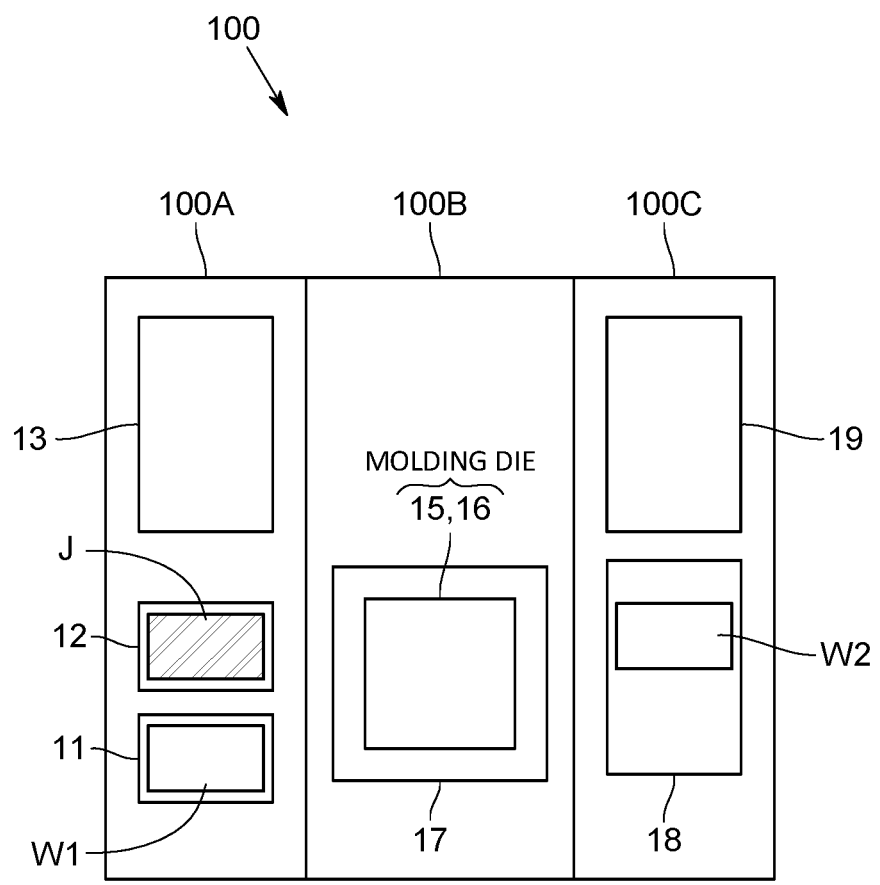
FIG. 1 is a schematic diagram illustrating a configuration of a resin molding apparatus according to an embodiment of the present invention.

REFERENCE SIGNS LIST 100 resin molding apparatus
W object to be molded
13 conveyance apparatus
141 pot block
15 molding die
15M recess
15M1 side surface of recess
15M2 bottom surface of recess
20 holding unit
23 pressing member
30 position reference mechanism
PR reference surface
31 reference surface member
32 lift mechanism
33 reference surface moving mechanism
321 lift member
322 up-down moving slide portion
322a up-down moving rail member
322b up-down moving slide member
332 cam driver
333 cam slider
34 horizontal slide portion
40 object-to-be-molded moving mechanism

DESCRIPTION OF EMBODIMENTS

Next, the present invention will be described in more detail with reference to examples. However, the present invention is not limited by the following description.

As described above, a conveyance apparatus of the present invention is a conveyance apparatus that conveys an object to be molded to a molding die in which a recess is formed on a die surface side on which the object to be molded is placed, the conveyance apparatus including: a position reference mechanism that has a reference surface serving as a positioning reference of the object to be molded placed on the molding die; and an object-to-be-molded moving mechanism that moves the object to be molded placed on the molding die toward the reference surface, in which the position reference mechanism includes: a reference surface member that has the reference surface and is provided to be able to come into contact with a side surface of the recess; and a lift mechanism that comes into contact with a bottom surface of the recess and brings the reference surface member into a state of being separated from a bottom surface of the recess; and, a reference surface moving mechanism that moves the reference surface member toward a side surface of the recess.

In this conveyance apparatus, after the reference surface member is separated from the bottom surface of the recess by the lift mechanism, the reference surface moving mechanism moves the reference surface member toward the side surface of the recess. Therefore, when the reference surface member is moved to the side surface of the recess, the reference surface member can be easily moved, and the reference surface member can be reliably brought into contact with the side surface of the recess. Furthermore, since the reference surface member does not come into contact with the bottom surface of the recess, it is possible to prevent the conveyance apparatus or the molding die from being scratched or damaged.

Specifically, it is conceivable that the molding die includes a pot block formed with a pot in which a resin material is accommodated, and the recess is formed by positioning the pot block below the mold surface.

In this configuration, the lift mechanism comes into contact with an upper surface of the pot block to separate the reference surface member from the upper surface of the pot block.

As a result, since the reference surface member does not come into contact with the upper surface of the pot block, it is possible to prevent the reference surface member from being damaged or the upper surface of the pot block from being scratched.

It is preferable that the conveyance apparatus of the present invention further includes a holding unit that holds the object to be molded, and the lift mechanism includes a lift member provided so as to be contactable with the bottom surface of the recess, and an up-down moving slide portion that slides the lift member so as to be moved up and down with respect to the holding unit.

With this configuration, since the lift member is configured to be movable up and down with respect to the holding unit, the lift member can be brought into contact with the bottom surface of the recess without accurately determining a position of the lift member in a vertical direction by the holding unit. That is, even if the holding unit descends after the lift member comes into contact with the bottom surface of the recess, the up-down moving slide portion absorbs an amount of descent of the holding unit. As a result, the lift member does not excessively push the bottom surface of the recess, and it is possible to prevent the lift member or the molding die from being scratched or damaged.

In order to determine a position of the reference surface member in the vertical direction only by bringing the lift member into contact with the bottom surface of the recess, it is desirable that the reference surface member be fixed in a relative position in the vertical direction with respect to the lift member, and be configured to be movable up and down with respect to the molding die together with the lift member.

In order to set the reference surface member to a position facing the side surface of the recess along a horizontal direction in a state where the lift member is in contact with the bottom surface of the recess, it is desirable that a distance along a vertical direction between a lower end of the reference surface member and a lower end of the lift member be smaller than a depth dimension of the recess.

In order to make the reference surface member movable in the horizontal direction while preventing the lift member in contact with the bottom surface of the recess from moving in the horizontal direction, it is desirable that the reference surface member be configured to be horizontally movable with respect to the lift member.

In order to horizontally move only the reference surface member while enabling up-and-down movement of the reference surface member and the lift member, it is desirable that the up-down moving slide portion include a rail member and a slide member that slides the rail member, and the reference surface member be configured to be horizontally movable with respect to the lift member by a horizontal slide portion provided on the slide member.

As a specific embodiment of the reference surface moving mechanism, it is conceivable to use a cam mechanism. Specifically, it is desirable that the reference surface moving mechanism include a cam that moves up and down by an actuator, and a follower that is provided on the reference surface member and horizontally moves in contact with the cam.

It is conceivable that the conveyance apparatus of the present invention further includes a pressing member that presses the object to be molded placed on the molding die toward the molding die. In order to realize downsizing of the conveyance apparatus and simplification of the structure in this configuration, it is desirable that the reference surface member and the lift mechanism be provided on the pressing member.

Furthermore, a resin molding apparatus including the above-described conveyance apparatus is also an aspect of the present invention.

In addition, a method for manufacturing a resin molded product of the present invention uses the above-described conveyance apparatus, and includes: bringing the reference surface member into contact with the molding die; moving and positioning the object to be molded placed on the molding die toward the reference surface; and molding the positioned object to be molded with a resin.

One Embodiment of the Present Invention

Hereinafter, an embodiment of a resin molding apparatus according to the present invention will be described with reference to the drawings. Note that any of the drawings illustrated below is schematically illustrated by omitting or exaggerating as appropriate for easy understanding. The same components are denoted by the same reference signs, and the description thereof will be omitted as appropriate.
<Overall Configuration of Resin Molding Apparatus 100>

A resin molding apparatus 100 according to the present embodiment performs resin molding on an object to be molded W1 on which an electronic component Wx is mounted, for example, by transfer molding using a resin material J.

Here, the object to be molded W1 is, for example, a metal substrate, a resin substrate, a glass substrate, a ceramic substrate, a circuit substrate, a semiconductor substrate, a wiring substrate, a lead frame, or the like, and the presence or absence of wiring is irrelevant. The electronic component Wx mounted on an upper surface of the object to be molded W1 is, for example, a bare chip or a resin-sealed chip. Furthermore, the resin material J for resin molding is, for example, a composite material containing a thermosetting resin, and the form of the resin material J is granular, powder, liquid, sheet, tablet, or the like.

Specifically, as illustrated in FIG. 1, the resin molding apparatus 100 includes, as components, a supply module 100A that supplies the object to be molded W1 and the resin material J before molding, a molding module 100B that performs resin molding, and a storage module 100C that stores the object to be molded W2 (Hereinafter, a resin molded product W2) after molding. Note that the supply module 100A, the molding module 100B, and the storage module 100C can be attached to and detached from other components and can be replaced with each other.

The supply module 100A includes an object-to-be-molded supply unit 11 that supplies the object to be molded W1, a resin material supply unit 12 that supplies the resin material J, and a conveyance apparatus 13 (Hereinafter, loader 13) that receives the object to be molded W1 from the object-to-be-molded supply unit 11, conveys the object to be molded W1 to the molding module 100B, receives the resin material J from the resin material supply unit 12, and conveys the object to be molded W1 to the molding module 100B.

The loader 13 moves back and forth between the supply module 100A and the molding module 100B, and moves along a rail (not illustrated) provided across the supply module 100A and the molding module 100B. Note that details of the loader 13 will be described later.

As illustrated in FIGS. 2 to 5, the molding module 100B includes one molding die 15 (Hereinafter, a lower molding die 15) of a molding die provided with a resin injection portion 14, the other molding die 16 (Hereinafter, an upper molding die 16) of the molding die provided to face the lower molding die 15 and formed with a cavity 16a into which the resin material J is injected, and a mold clamping mechanism 17 for clamping the lower molding die 15 and the upper molding die 16. The lower molding die 15 is provided on a movable platen 101 that moves up and down by the mold clamping mechanism 17 via a lower platen 102. The upper molding die 16 is provided on an upper fixed platen (not illustrated) via an upper platen 103.

The resin injection portion 14 of the present embodiment includes a pot block 141 in which a pot 141a for accommodating the resin material J is formed, a plunger 142 for pressure-feeding the resin material J accommodated in the pot 141a, and a plunger drive unit 143 for driving the plunger 142. Note that the plunger 142 pumps the resin material J heated and melted in the pot 141a.

The pot block 141 is positioned below a mold surface 15a of the lower molding die 15 on which the object to be molded W1 is placed. That is, an upper surface 141b of the pot block 141 is positioned below the mold surface 15a of the lower molding die 15 (See "DETAILS OF RECESS" in FIG. 2). With this configuration, a recess 15M is formed on a side of the mold surface 15a of the lower molding die 15. Furthermore, an upper surface 141b of the pot block 141 is a bottom surface 15M2 of the recess 15M.

The upper molding die 16 is formed with a cavity 16a that accommodates the electronic component Wx of the object to be molded W1 and into which the molten resin material J is injected. Furthermore, in the upper molding die 16, a cal portion 16b that is a recess is formed at a portion facing the pot 141a, and a runner portion 16c that connects the cal portion 16b and the cavity 16a is formed. Note that, although not illustrated, an air vent is formed on the upper molding die 16 on a side opposite to the pot 141a.

Figure 3:
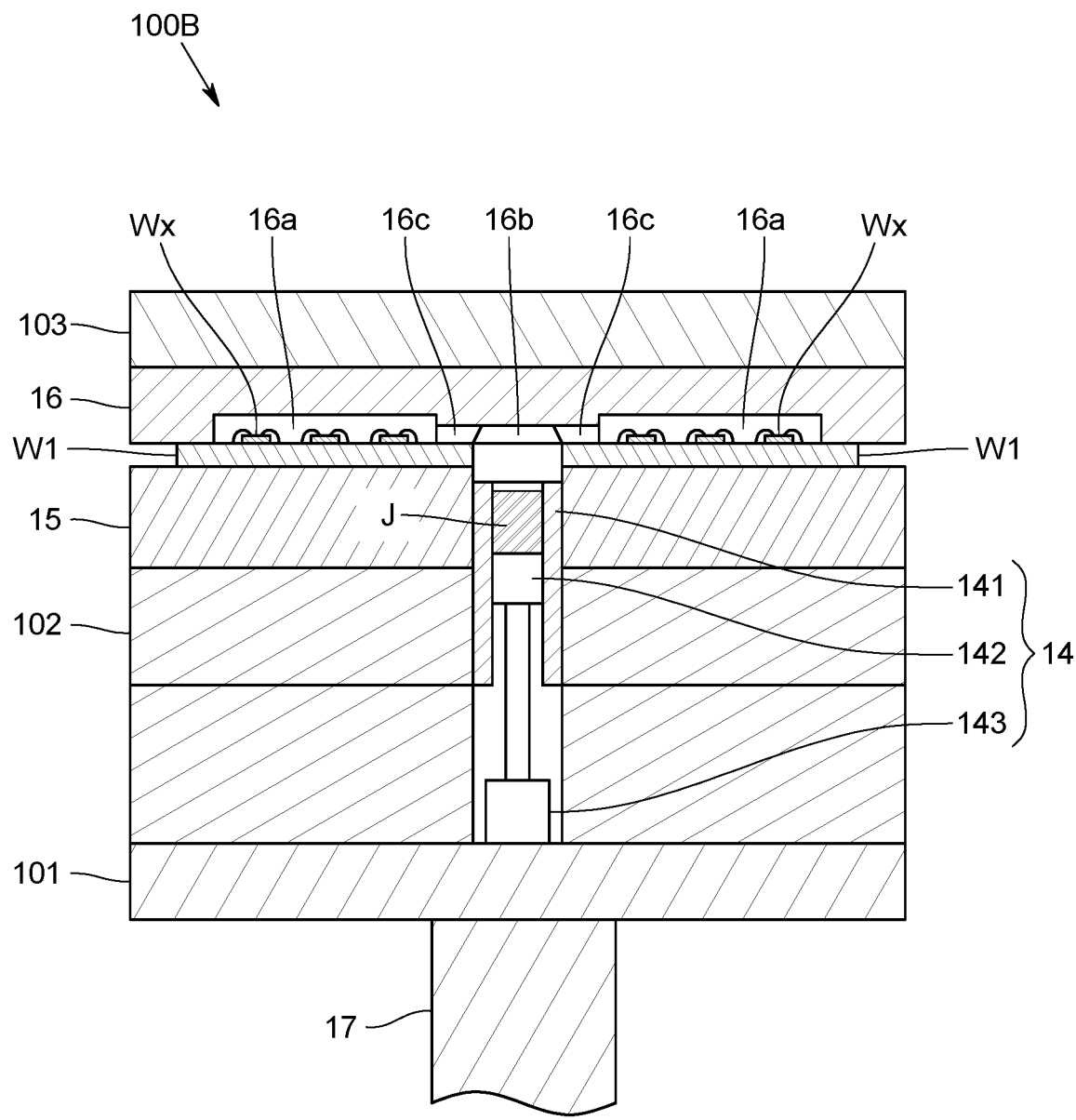
FIG. 3 is a schematic diagram illustrating a mold clamping state of the molding module in the same embodiment.

Then, as illustrated in FIG. 3, when the lower molding die 15 and the upper molding die 16 are clamped by the mold clamping mechanism 17, a resin flow path including the cal portion 16b and the runner portion 16c allows the pot 141a and the cavity 16a to communicate with each other. In this state, when the melted resin material J is injected into the cavity 16a by the plunger 142, the electronic component Wx of the object to be molded W1 is resin-sealed.

The storage module 100C is provided with a storage part 18 that stores the resin molded product W2, and a conveyance apparatus 19 (Hereinafter, an unloader 19) that receives the resin molded product W2 from the molding module 100B and conveys the resin molded product W2 to the storage part 18.

The unloader 19 moves back and forth between the molding module 100B and the storage module 100C, and moves along a rail (not illustrated) provided across the molding module 100B and the storage module 100C.
<Basic Operation of Resin Molding Apparatus 100>

The basic operation of the resin molding apparatus 100 will be briefly described with reference to FIGS. 2 to 5.

Figure 2:
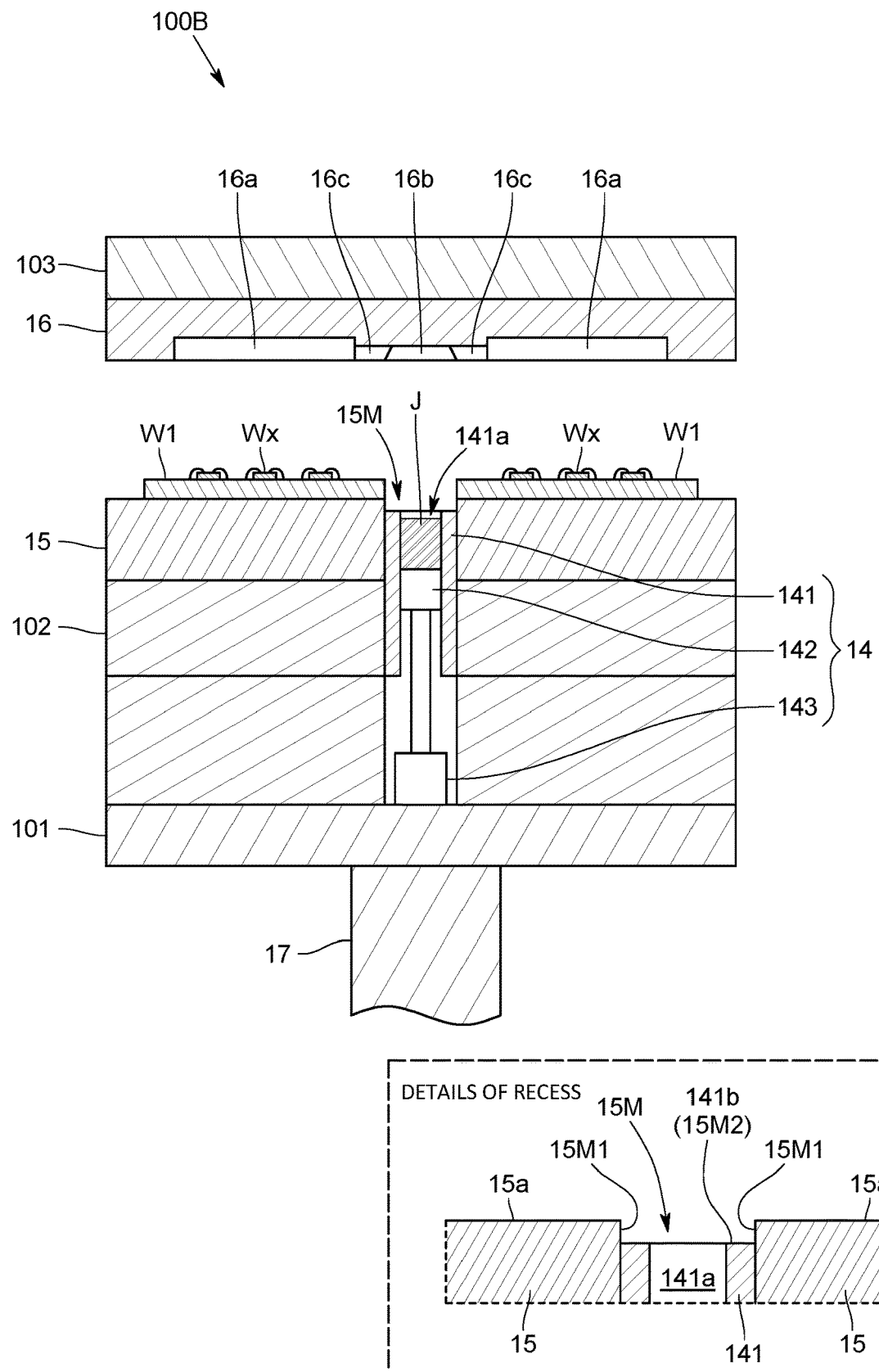
FIG. 2 is a schematic diagram illustrating an object-to-be-molded placement state and a resin material loading state of a molding module in the same embodiment.

As illustrated in FIG. 2, in a state where the lower molding die 15 and the upper molding die 16 are opened, the object to be molded W1 before molding is conveyed by the loader 13 and transferred to the lower molding die 15 to be placed thereon. At this time, the upper molding die 16 and the lower molding die 15 are heated to a temperature at which the resin material J can be melted and cured. Thereafter, the object to be molded W1 on the lower molding die 15 is positioned by the loader 13 as described later, and the resin material J is conveyed and stored in the pot 141a of the pot block 141.

Figure 4:
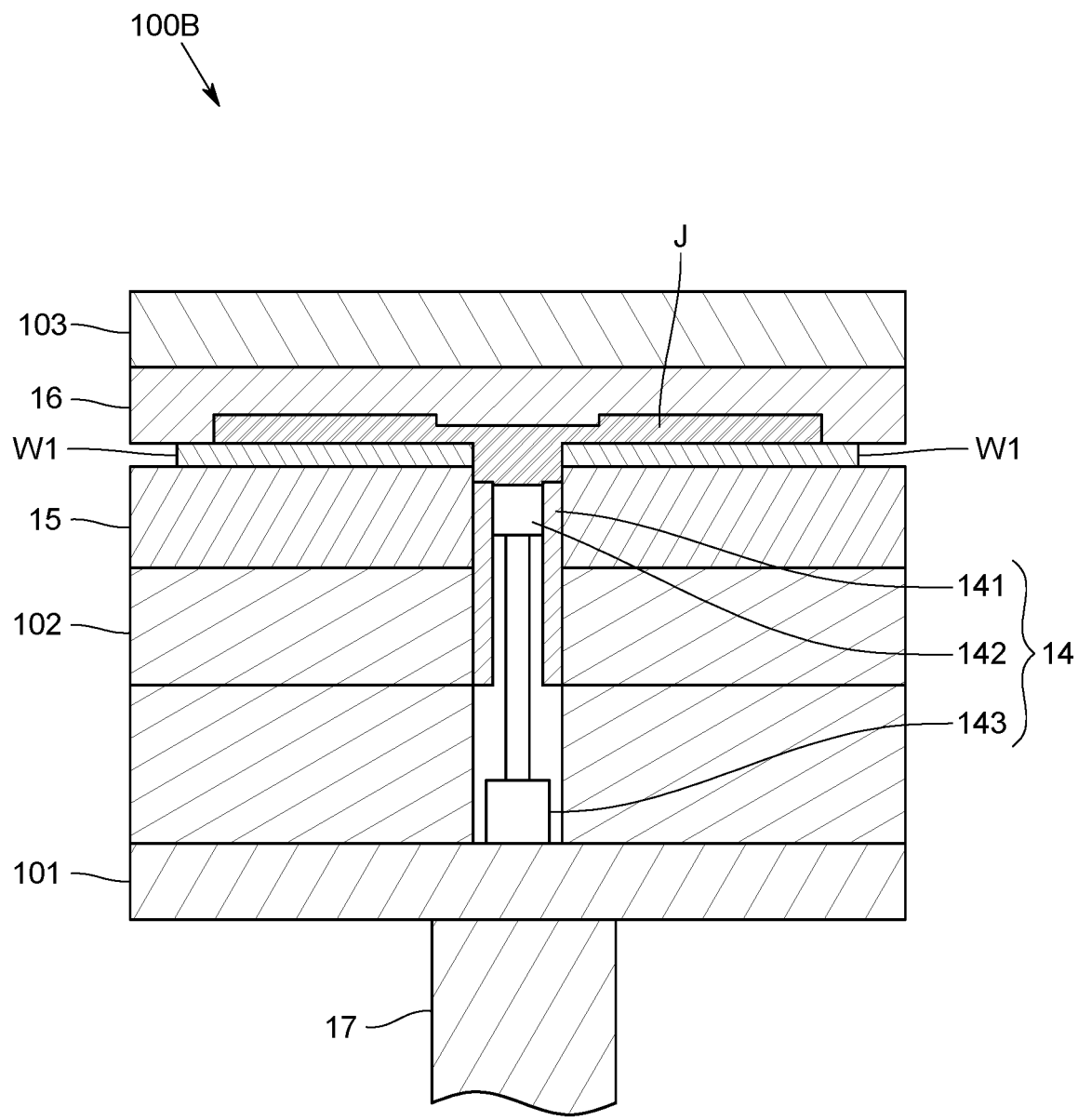
FIG. 4 is a schematic diagram illustrating a resin injection state of the molding module in the same embodiment.
Figure 5:
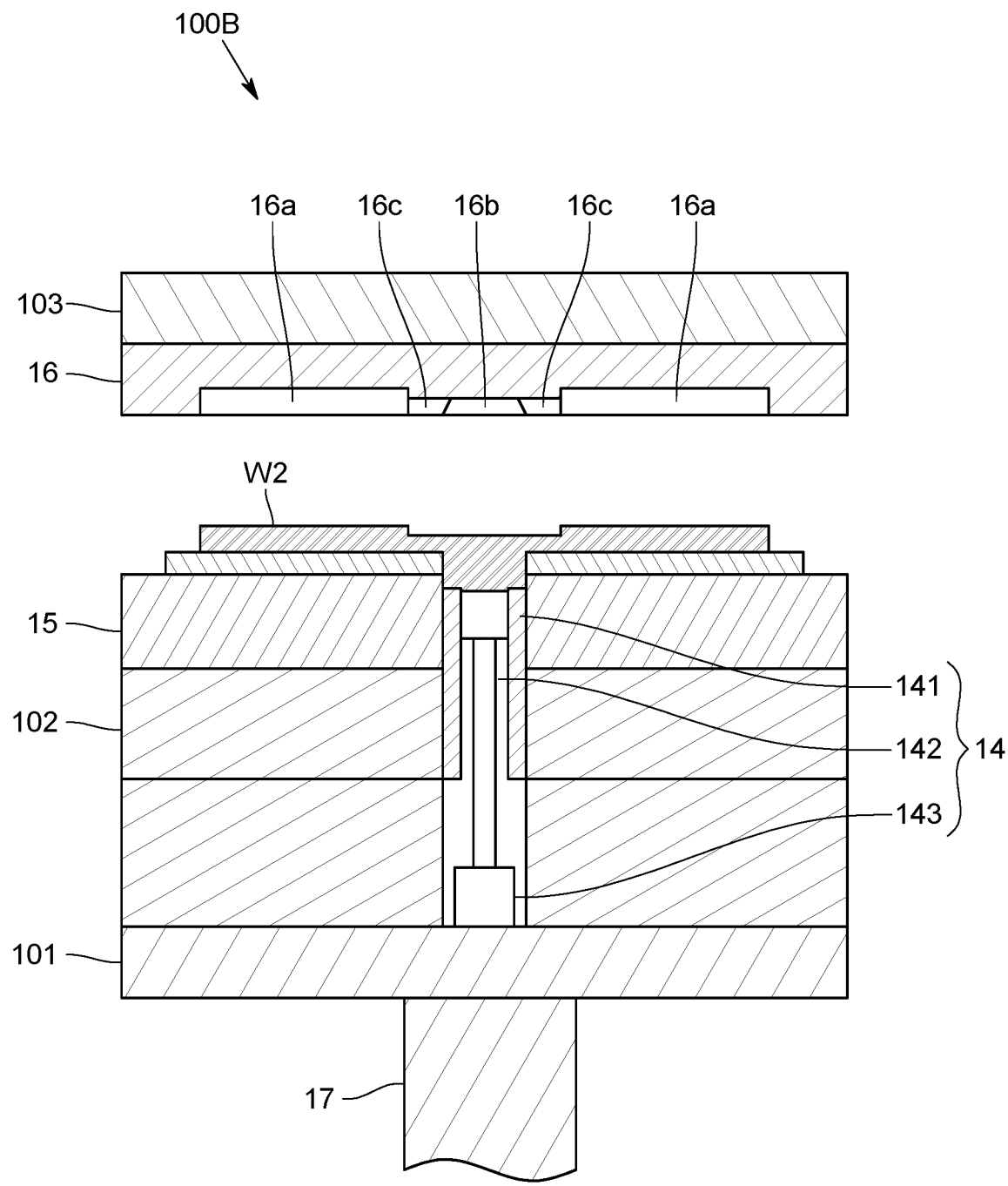
FIG. 5 is a schematic diagram illustrating a mold opening state of the molding module in the same embodiment.

In this state, when the lower molding die 15 is raised by the mold clamping mechanism 17, the lower molding die 15 and the upper molding die 16 are clamped (see FIG. 3). When the plunger 142 is raised by the plunger drive unit 143 after the clamping, the molten resin material J in the pot 141a is injected into the cavity 16a through a resin passage as illustrated in FIG. 4. Then, after the resin material J is cured in the cavity 16a, as illustrated in FIG. 5, the molding dies are opened by the mold clamping mechanism 17, and the resin molded product W2 is carried out by the unloader 19 and conveyed to the storage part 18.

<Specific Configuration of Loader 13>

Next, a specific configuration of the loader 13 in the present embodiment will be described with reference to FIGS. 6 to 16. Note that in FIGS. 6 to 16, illustration of the electronic component Wx is omitted.

Figure 6:
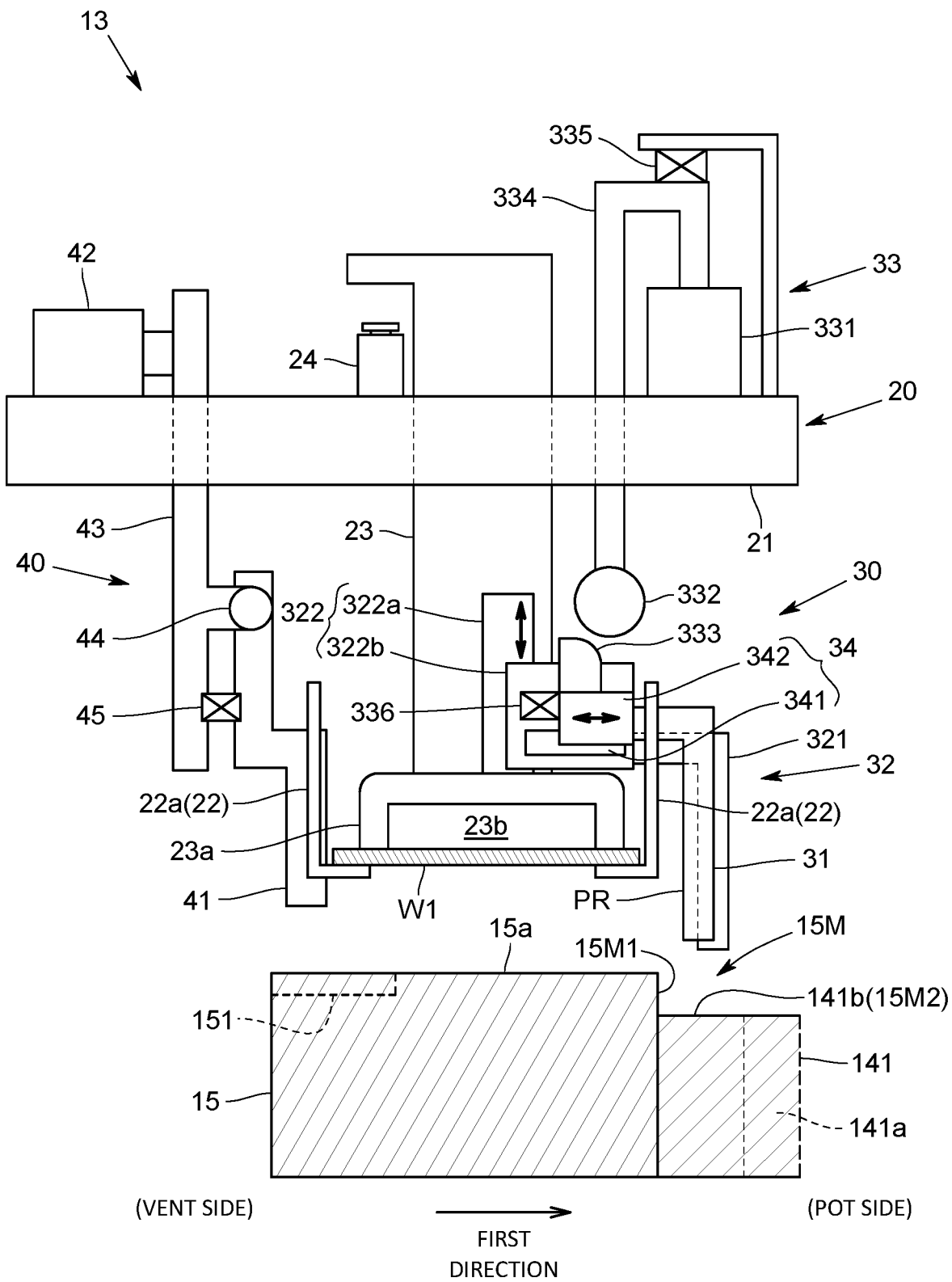
FIG. 6 is a side view schematically illustrating a state where a conveyance apparatus in the same embodiment holds an object to be molded.

As illustrated in FIG. 6 and the like, the loader 13 includes a holding unit 20 that holds and transfers the object to be molded W1 to the lower molding die 15 for placement, a position reference mechanism 30 having a reference surface PR serving as a positioning reference of the object to be molded W1 placed on the lower molding die 15, and an object-to-be-molded moving mechanism 40 that moves the object to be molded W1 placed on the lower molding die 15 toward the reference surface PR.

(1) Configuration of Holding Unit 20

As illustrated in FIG. 6 and the like, the holding unit 20 includes a base member 21 provided movably along a rail (not illustrated), a holding mechanism 22 provided on the base member 21 to hold the object to be molded W1, a pressing member 23 that presses the object to be molded W1 placed on the lower molding die 15, and an up-down moving mechanism 24 that moves the pressing member 23 up and down. Furthermore, the base member 21 is provided with a resin holding portion (not illustrated) that holds the resin material J.

As illustrated in FIG. 6 and the like, the holding mechanism 22 includes a pair of conveyance claws 22a that hooks and holds both ends of the object to be molded W1, and a drive unit (not illustrated) that enlarges or reduces an interval between the conveyance claws 22a. The object to be molded W1 is hooked and held by reducing the interval between the conveyance claws 22a by the drive unit, and the holding of the object to be molded W1 is released by increasing the interval between the conveyance claws 22a. As illustrated in FIG. 6, the holding mechanism 22 of the present embodiment holds the pressing member 23 together with the object to be molded W1 in a state where the object to be molded W1 is hooked and held on the conveyance claw 22a. That is, the pressing member 23 is placed on an upper surface of the object to be molded W1 held by the conveyance claws 22a. Note that the holding mechanism 22 may not hold the pressing member 23.

As illustrated in FIG. 6 and the like, the pressing member 23 presses an outer peripheral edge portion of the object to be molded W1 to suppress warpage of the object to be molded W1. Specifically, on a lower surface of the pressing member 23, a pressing portion 23a in contact with the outer peripheral edge portion of the object to be molded W1 is provided, and a recess 23b for accommodating the electronic component Wx mounted on the object to be molded W1 is formed. In addition, as will be described later, a reference surface member 31 of the position reference mechanism 30 and a lift mechanism 32 are provided in the pressing member 23.

As illustrated in FIG. 6 and the like, the up-down moving mechanism 24 is provided on the base member 21 to adjust a height position of the pressing member 23 with respect to the object to be molded W1. The up-down moving mechanism 24 of the present embodiment is configured using, for example, an air cylinder, and can set the pressing member 23 to (a) a state of pressing the object to be molded W1 held by the holding mechanism 22 (see FIGS. 6, 10, and 11), (b) a state of being separated from the object to be molded W1 held by the holding mechanism 22 (see FIG. 12), (c) a state of pressing the object to be molded W1 placed on the lower molding die 15 (see FIG. 15), and (d) a state of being separated from the object to be molded W1 placed on the lower molding die 15 (see FIGS. 13, 14, and 16).

(2) Configuration of Position Reference Mechanism 30

Figure 7:
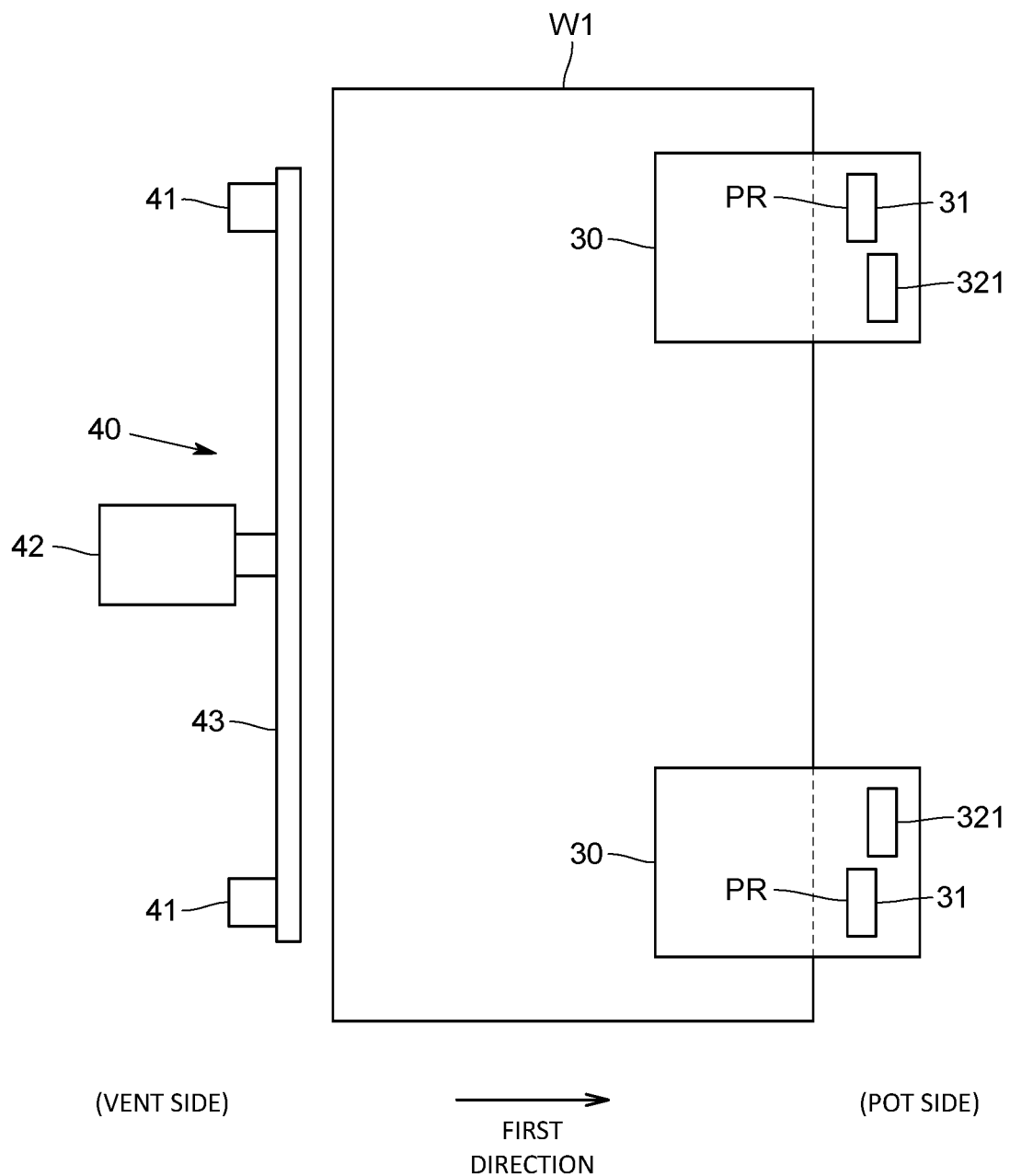
FIG. 7 is a plan view schematically illustrating an arrangement mode of a reference position mechanism and an object-to-be-molded moving mechanism with respect to the object to be molded in the same embodiment.

As illustrated in FIG. 6 and the like, the position reference mechanism 30 includes a reference surface member 31 having the reference surface PR and provided so as to be able to come into contact with the side surface 15M1 of the recess 15M, the lift mechanism 32 that comes into contact with the bottom surface 15M2 of the recess 15M to bring the reference surface member 31 into a state of being separated from the bottom surface 15M2 of the recess 15M, and a reference surface moving mechanism 33 that moves the reference surface member 31 toward the side surface 15M1 of the recess 15M in a state where the reference surface member 31 is separated from the bottom surface 15M2 of the recess 15M by the lift mechanism 32. Note that, as illustrated in FIG. 7, a plurality of (here, two) the position reference mechanisms 30 are provided in a width direction orthogonal to a first direction (direction from a vent side to a pot side).

The reference surface member 31 is in contact with the side surface 15M1 of the recess 15M formed in the lower molding die 15, and the planar reference surface PR is formed on a surface facing the vent side. The reference surface member 31 comes into contact with the side surface 15M1 of the recess 15M, and the reference surface PR is set at a position serving as a positioning reference of the object to be molded W1.

Figure 8:
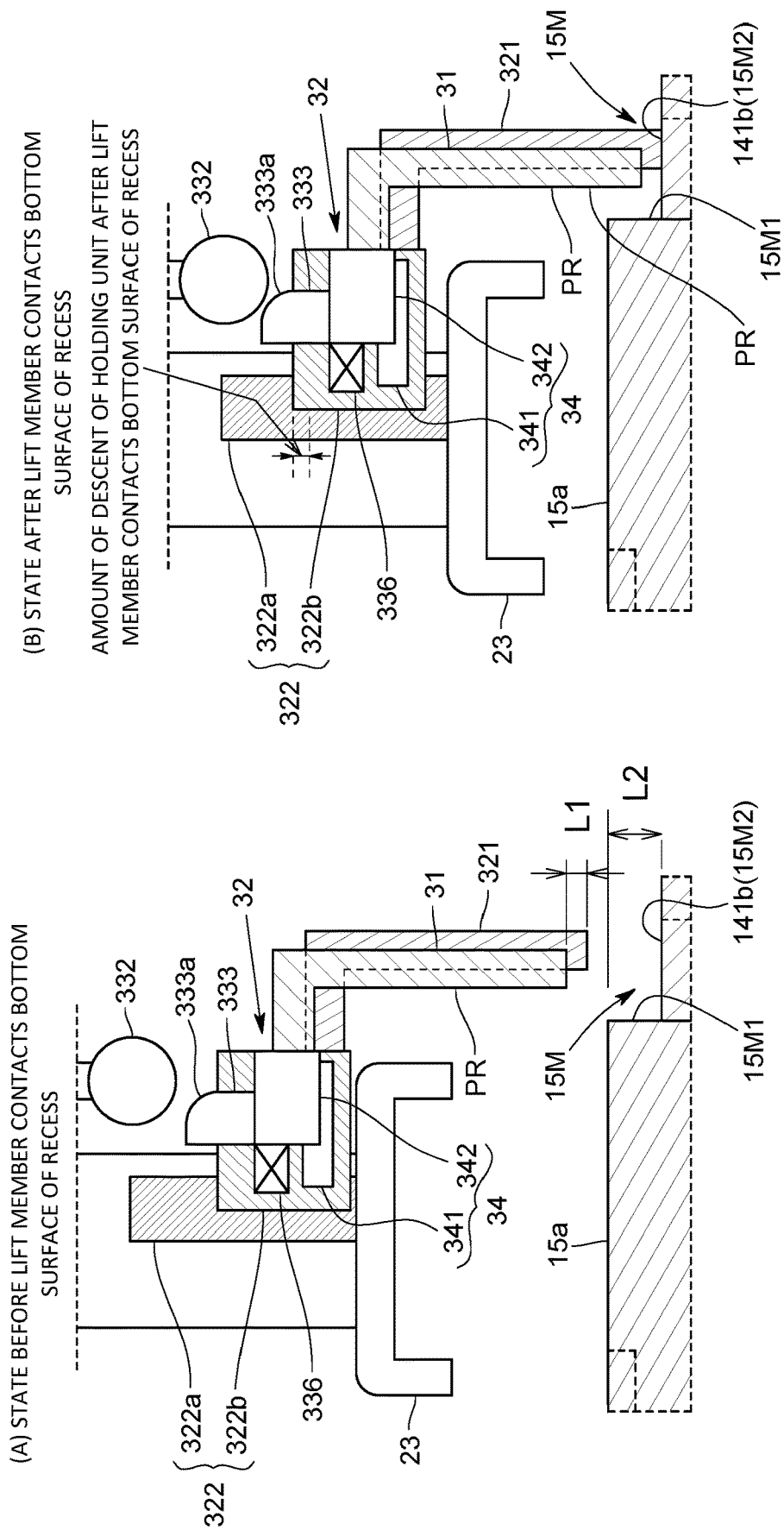
FIG. 8 is a side view schematically illustrating an operation of a lift mechanism in the same embodiment.

The lift mechanism 32 is brought into contact with the upper surface 141b of the pot block 141 (the bottom surface 15M2 of the recess 15M) to cause the reference surface member 31 to be separated from the upper surface 141b of the pot block 141 by a predetermined distance set in advance (see FIG. 8). Specifically, the lift mechanism 32 includes a lift member 321 provided so as to be able to contact the upper surface 141b of the pot block 141 (the bottom surface 15M2 of the recess 15M), and an up-down moving slide portion 322 that slides the lift member 321 so as to be moved up and down with respect to the holding unit 20.

A relative position of the lift member 321 in the vertical direction with respect to the reference surface member 31 is fixed, and a distance along the vertical direction between a lower end of the reference surface member 31 and a lower end of the lift member 321 is fixed. As illustrated in FIG. 8, a distance L1 along the vertical direction between the lower end of the reference surface member 31 and the lower end of the lift member 321 is set to be smaller than a depth dimension L2 (that is, a distance between the mold surface 15a and the upper surface 141b of the pot block 141 in the vertical direction) of the recess 15M.

The up-down moving slide portion 322 includes an up-down moving rail member 322a provided along the vertical direction on a side of the holding unit 20, and an up-down moving slide member 322b that slides the up-down moving rail member 322a and is provided with the lift member 321. The up-down moving rail member 322a of the present embodiment is provided on the pressing member 23. That is, the lift member 321 is configured to be movable up and down with respect to the pressing member 23.

The reference surface member 31 is configured to be vertically movable with respect to the lower molding die 15 together with the lift member 321, and is configured to be horizontally movable with respect to the lift member 321.

Figure 9:
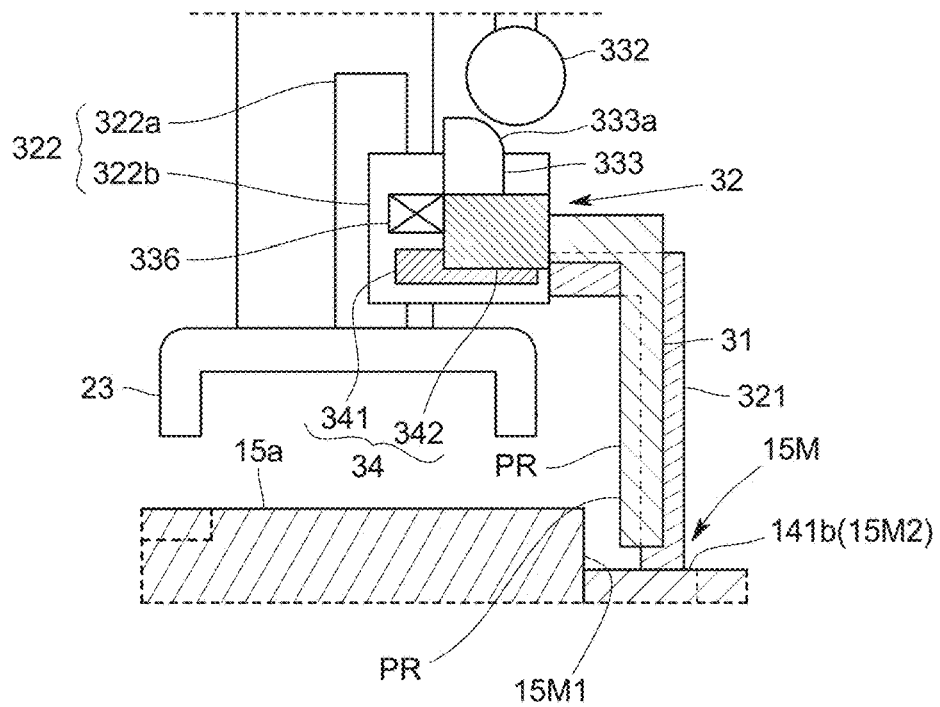
FIG. 9 is a side view schematically illustrating an operation of a reference surface moving mechanism in the same embodiment.
Figure 9:
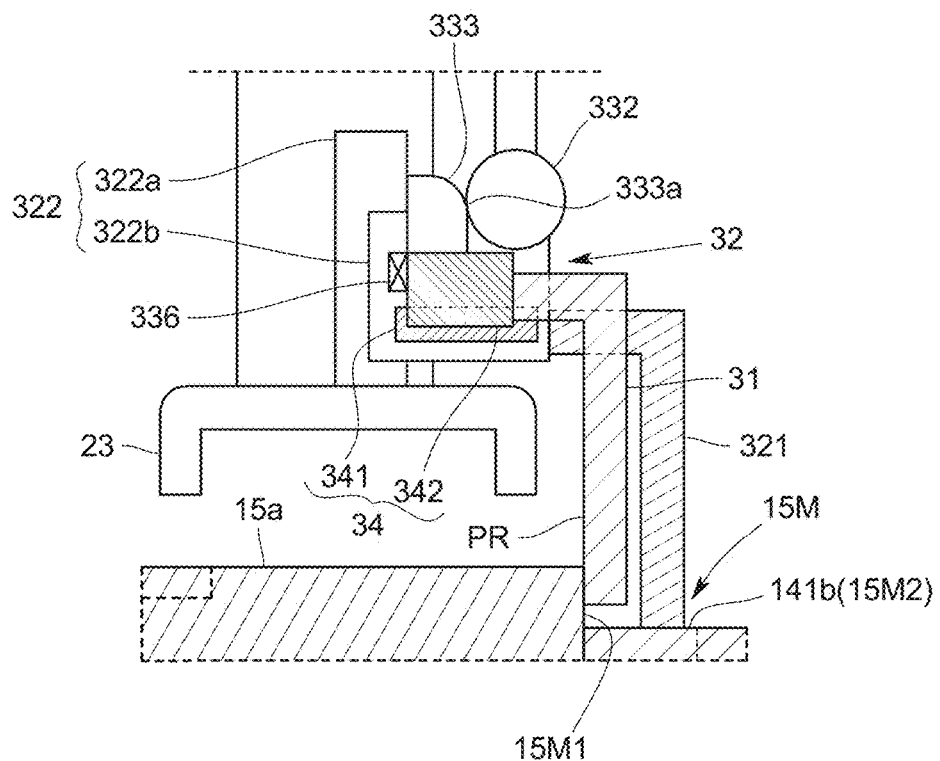

Specifically, the reference surface member 31 is configured to be horizontally movable with respect to the lift member 321 by a horizontal slide portion 34 provided on the up-down moving slide member 322b (see FIG. 9). Here, the horizontal slide portion 34 includes a horizontal rail member 341 provided along the horizontal direction on the up-down moving slide member 322b, and a horizontal slide member 342 that slides the horizontal rail member 341 and is provided with the reference surface member 31. As described above, by providing the reference surface member 31 on the up-down moving slide member 322b via the horizontal slide portion 34, it is configured to be movable horizontally with respect to the lift member 321 while being movable up and down together with the lift member 321.

The reference surface moving mechanism 33 moves the reference surface member 31 having the reference surface PR in the horizontal direction, and is configured using a cam mechanism. Specifically, the reference surface moving mechanism 33 includes an actuator 331 provided in the holding unit 20, a cam driver 332 that moves up and down by the actuator 331, and a cam slider 333 that is provided in the reference surface member 31 and moves along the horizontal direction in contact with the cam driver 332.

The actuator 331 is provided on the base member 21 of the holding unit 20 and moves the cam driver 332 up and down along the vertical direction, and is configured using, for example, an air cylinder.

The cam driver 332 is provided at a lower end portion of a lever member 334 that moves up and down by the air cylinder 331. The lever member 334 is raised by turning on the air cylinder 331. Furthermore, the lever member 334 is biased downward by an elastic member 335 such as a spring, and when the air cylinder 331 is turned off, the lever member descends while receiving an elastic force of the elastic member 335.

The cam slider 333 is provided above the horizontal slide member 342 provided with the reference surface member 31. The cam slider 333 has an inclined surface 333a facing a side of the pot 141a (see FIGS. 8 and 9), and when the cam driver 332 descends, the cam driver 332 comes into contact with the inclined surface 333a and moves toward the vent side (a side of the side surface 15M1 of the recess 15M) along the horizontal direction. Furthermore, the cam slider 333 is biased toward the pot side (in a direction away from the side surface 15M1 of the recess 15M) by an elastic member 336 such as a spring, and moves toward the pot side while receiving an elastic force of the elastic member 336 when the cam driver 332 rises.

Here, in the cam slider 333, in a state where the cam driver 332 is lowered and the reference surface member 31 is in contact with the side surface 15M1 of the recess 15M, an inclination angle of the inclined surface 333a with which the cam driver 332 is in contact is set to an angle within a range of 0 degrees to 30 degrees, preferably within a range of 0 degrees to 15 degrees from the vertical direction. With this configuration, when the object to be molded W1 is positioned using the reference surface PR, the reference surface member 31 can be prevented from moving by a reaction force that the reference surface member 31 receives from the object to be molded W1.

(3) Configuration of Object-to-be-Molded Moving Mechanism 40

As illustrated in FIG. 6 and the like, the object-to-be-molded moving mechanism 40 slidingly moves the object to be molded W1 placed on the lower molding die 15 to the pot side, and positions the object to be molded W1 using the reference surface PR fixed by the position reference mechanism 30.

Specifically, the object-to-be-molded moving mechanism 40 includes an object-to-be-molded contact portion 41 that is movably provided in the holding unit 20 and is in contact with the object to be molded W1, and an object-to-be-molded driving unit 42 that moves the object-to-be-molded contact portion 41.

The object-to-be-molded contact portion 41 of the present embodiment is provided on the base member 21 of the holding unit 20 so as to be movable in the first direction (direction from the vent side to the pot side), and is in contact with a vent-side end portion of the object to be molded W1. The object-to-be-molded contact portion 41 has, for example, a rod shape, and is provided in plurals (for example, two) in the width direction orthogonal to the first direction (see FIG. 7).

The object-to-be-molded driving unit 42 moves the object-to-be-molded contact portion 41 in the first direction to bring a pot-side end portion of the object to be molded W1 into contact with the reference surface PR for positioning. The object-to-be-molded driving unit 42 is configured using, for example, an air cylinder.

Figure 11:
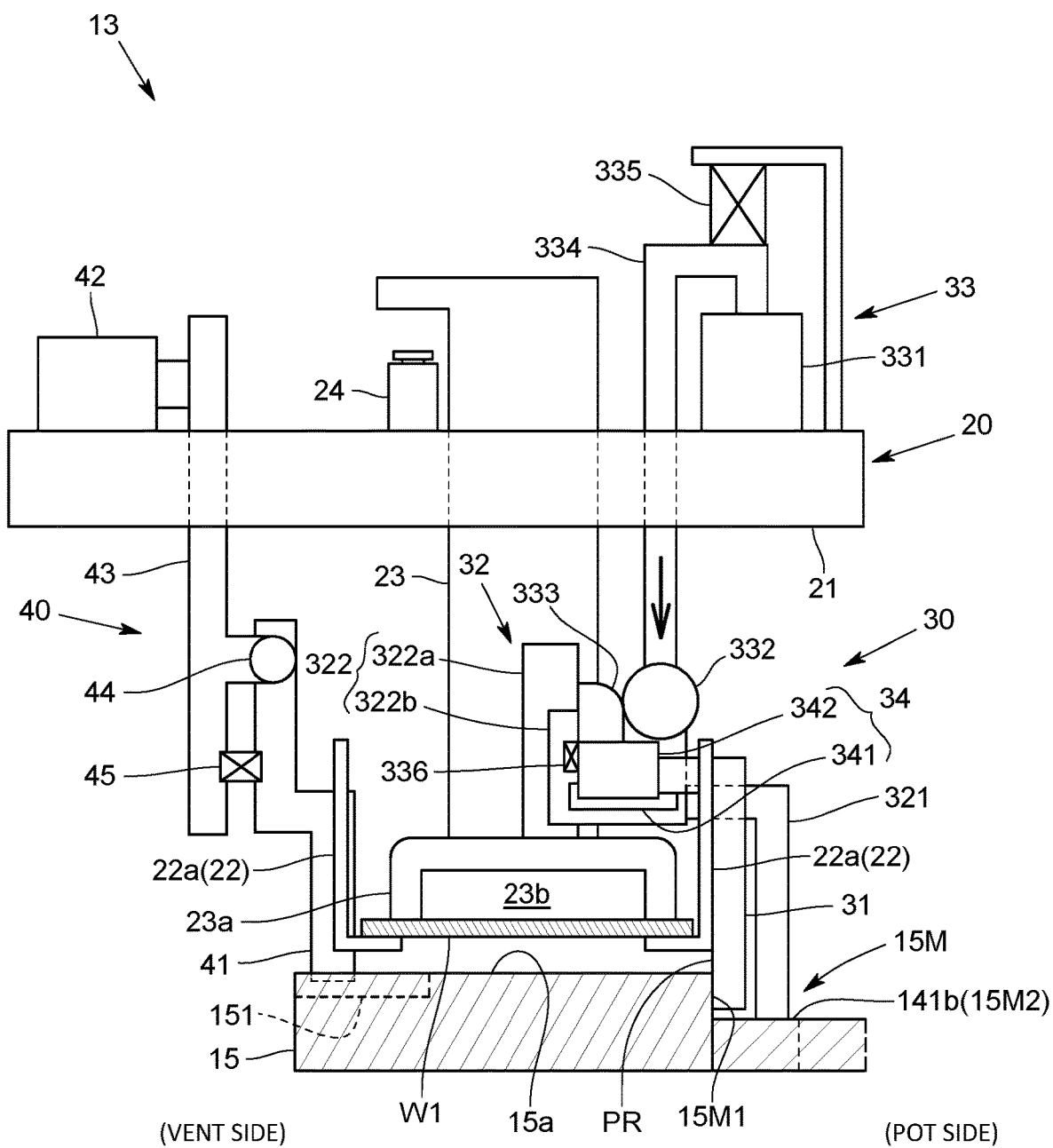
FIG. 11 is a plan view schematically illustrating a state where a reference surface member of the conveyance apparatus in the same embodiment is in contact with a side surface of the recess.

Furthermore, the object-to-be-molded contact portion 41 and the object-to-be-molded driving unit 42 are connected via a connecting member 43. An upper end portion of the object-to-be-molded contact portion 41 is rotatably connected to the connecting member 43 by a rotating member 44, and a lower end portion thereof is configured to be in contact with the vent-side end portion of the object to be molded W1. Note that, as illustrated in FIG. 11 and the like, the lower molding die 15 is provided with a clearance groove 151 at least in a movement range of the lower end portion of the object-to-be-molded contact portion 41 so as not to hinder the movement of the object-to-be-molded contact portion 41.

Moreover, as illustrated in FIG. 6 and the like, the object-to-be-molded moving mechanism 40 includes an elastic member 45 such as a spring that is elastically deformed along with the movement of the object-to-be-molded contact portion 41 in the first direction to bias the object-to-be-molded contact portion 41 toward the pot side. The elastic member 45 of the present embodiment is provided between the connecting member 43 and the object-to-be-molded contact portion 41. The elastic member 45 is provided on the vent side with respect to the object-to-be-molded contact portion 41, absorbs a movement amount of the object-to-be-molded driving unit 42 after the object-to-be-molded contact portion 41 comes into contact with the object to be molded W1, and presses the pot-side end portion of the object to be molded W1 against the reference surface PR by its elastic force (see FIG. 14).

<Operation of Loader 13>

Next, a conveyance operation and a positioning operation of the loader 13 will be described with reference to FIGS. 6 to 16.

Figure 10:
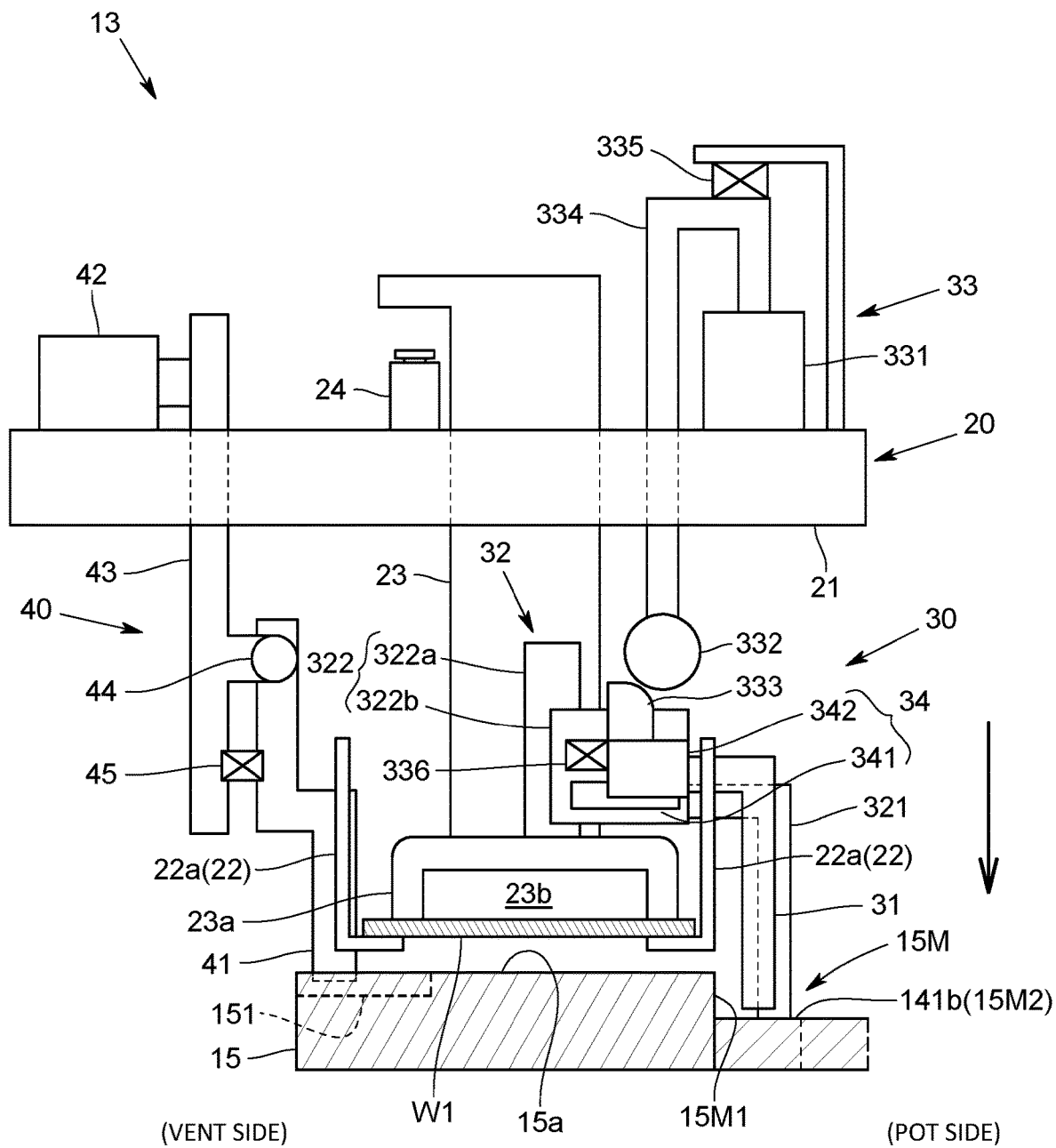
FIG. 10 is a side view schematically illustrating a state where a lift member of the conveyance apparatus in the same embodiment is in contact with a bottom surface of a recess.

First, as illustrated in FIG. 6, after the loader 13 is moved above the lower molding die 15, as illustrated in FIG. 10, the loader 13 is lowered until the lift member 321 of the lift mechanism 32 comes into contact with the upper surface 141b of the pot block 141.

Here, as an aspect in which the lift member 321 is lowered until coming into contact with the upper surface 141b of the pot block 141, a configuration in which the loader 13 is lowered by a preset lowering amount, a configuration in which a sliding amount of the lift member 321 on the up-down moving slide portion 322 is detected by a sensor such as a contact sensor, and the like are considered. By the lowering operation of the loader 13, the lower end of the reference surface member 31 is located inside the recess 15M, is separated from the bottom surface 15M2 of the recess 15M, and faces the side surface 15M1 of the recess 15M (see FIG. 8(B)).

Next, as illustrated in FIG. 11, the reference surface moving mechanism 33 moves the reference surface member 31 to a side of the side surface 15M1 (the vent side) of the recess 15M along the horizontal direction. Specifically, the cam driver 332 is lowered by the actuator 331 of the reference surface moving mechanism 33, and the cam slider 333 is horizontally moved by the horizontal slide portion 34, whereby the reference surface member 31 is brought into contact with and fixed to the side surface 15M1 of the recess 15M. As a result, the reference surface PR as a positioning reference of the object to be molded W1 is fixed to the lower molding die 15 (see FIG. 9(B)).

In the present embodiment, the reference surface PR is fixed to the lower molding die 15 before the object to be molded W1 is placed on the lower molding die 15. Note that, when the reference surface PR is fixed to the lower molding die 15 after the object to be molded W1 is placed on the lower molding die 15, the object to be molded W1 may jump out toward a side of the pot 141a when placed on the lower molding die 15. When the reference surface member 31 is moved in this state, there is a possibility that the object to be molded W1 is flicked toward the vent side by the reference surface member 31, and there is a case where positioning cannot be performed.

Figure 12:
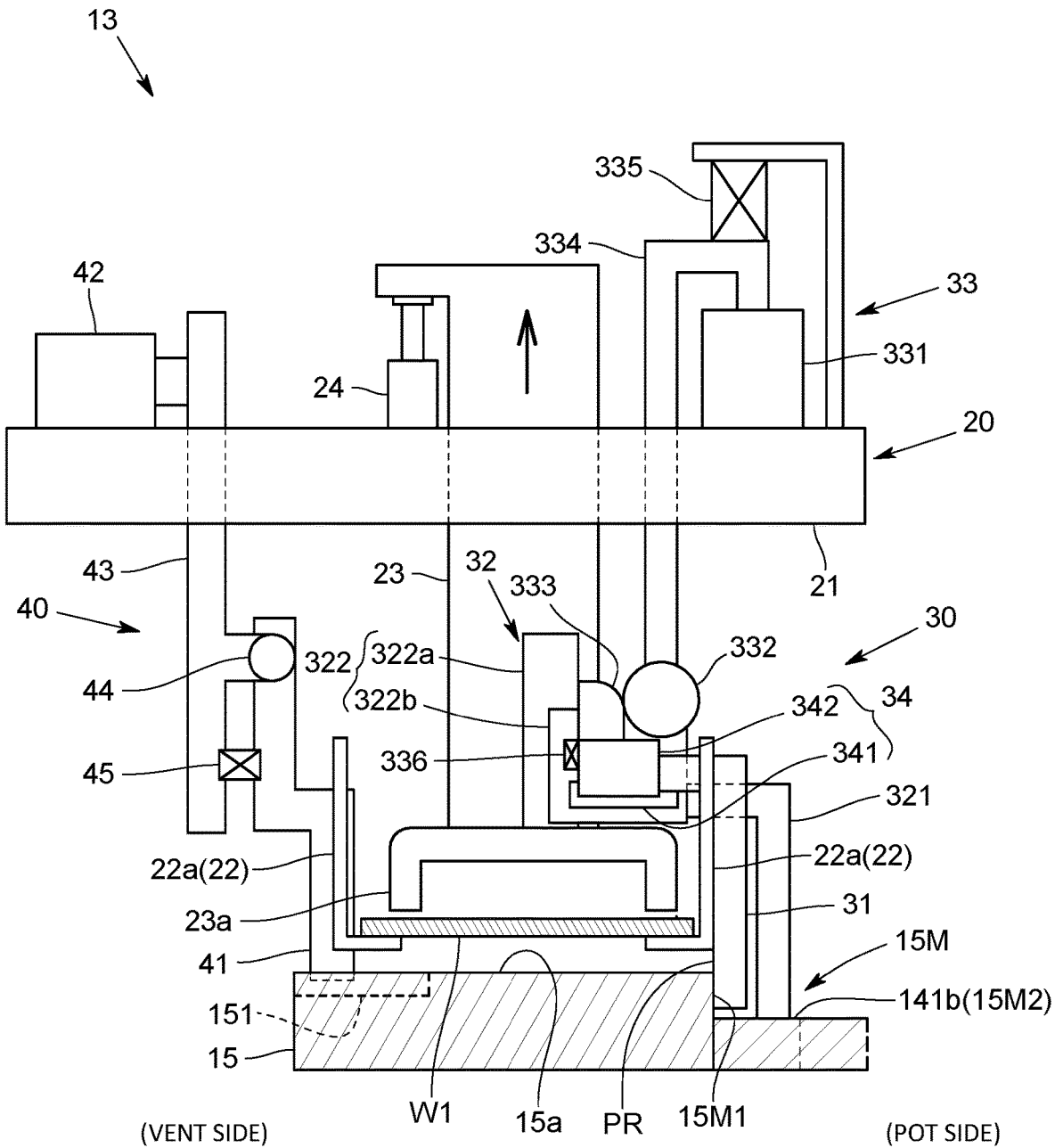
FIG. 12 is a side view schematically illustrating a state where the conveyance apparatus in the same embodiment separates a pressing member from the object to be molded.
Figure 13:
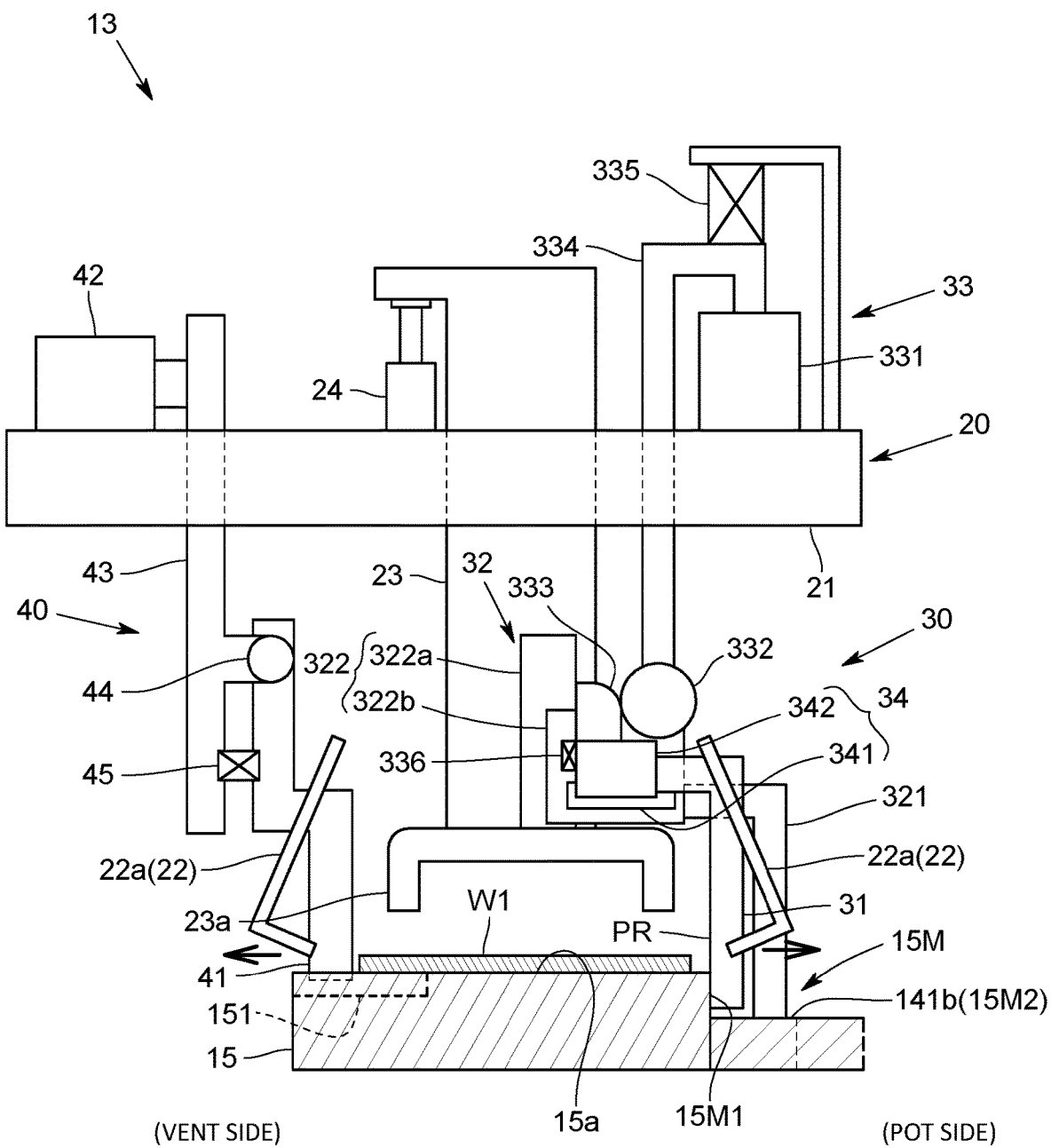
FIG. 13 is a side view schematically illustrating a state where the conveyance apparatus in the same embodiment places the object to be molded on a lower molding die.

As illustrated in FIG. 12, before releasing the holding of the object to be molded W1 by the conveyance claws 22a, the loader 13 lifts the pressing member 23 by the up-down moving mechanism 24 to bring the object to be molded W1 into a non-pressed state (floating state). Thereafter, as illustrated in FIG. 13, the loader 13 increases the interval between the conveyance claws 22a to release the holding of the object to be molded W1 by the holding mechanism 22, and places the object to be molded W1 on the lower molding die 15.

In the present embodiment, the pressing member 23 is in a floating state from the object to be molded W1 before releasing the holding of the object to be molded W1, thereby preventing the object to be molded W1 from being damaged or misplaced. On the other hand, when the conveyance claws 22a are opened while the object to be molded W1 is pressed by the pressing member 23, the object to be molded W1 moves due to friction between the conveyance claws 22a and the object to be molded W1, and the object to be molded W1 is damaged or misplaced.

Figure 14:
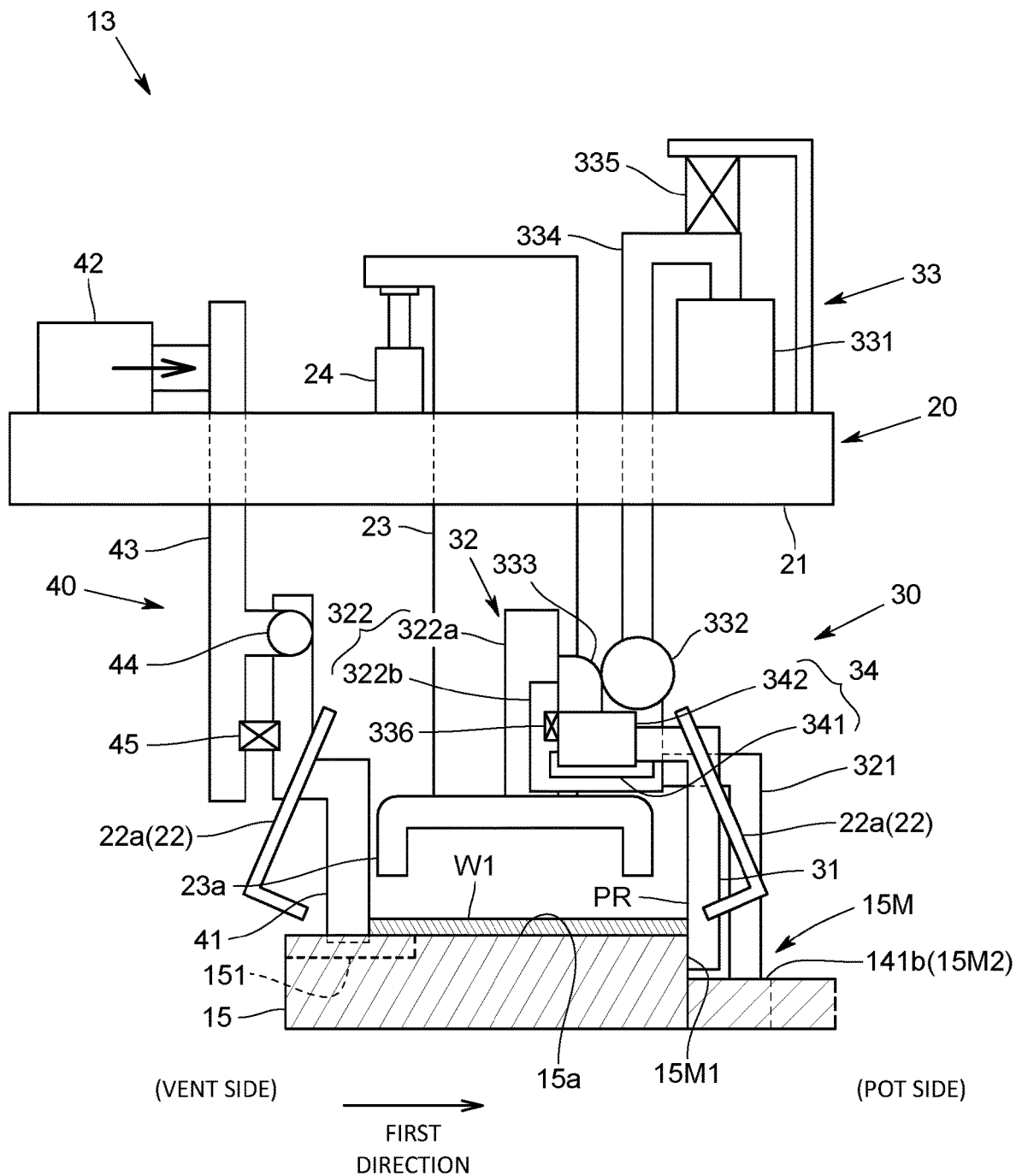
FIG. 14 is a plan view schematically illustrating a state where an object-to-be-molded moving mechanism of the conveyance apparatus in the same embodiment moves the object to be molded toward a reference surface.

After the object to be molded W1 is placed on the lower molding die 15, as illustrated in FIG. 14, the object-to-be-molded moving mechanism 40 moves the object to be molded W1 to the pot side along the first direction. This movement in the first direction brings the pot-side end portion of the object to be molded W1 into contact with the reference surface PR, and the elastic member 45 elastically deforms to cause the object-to-be-molded contact portion 41 to press the object to be molded W1 against the reference surface PR.

The positioning operation of the object to be molded W1 by the object-to-be-molded moving mechanism 40 is desirably performed twice or more. When the pot-side end portion of the object to be molded W1 floats from the mold surface 15a, the object to be molded W1 may protrude to the pot side in the next operation (operation of pressing with the pressing member 23), but this possibility is reduced by performing the positioning operation twice or more.

Figure 15:
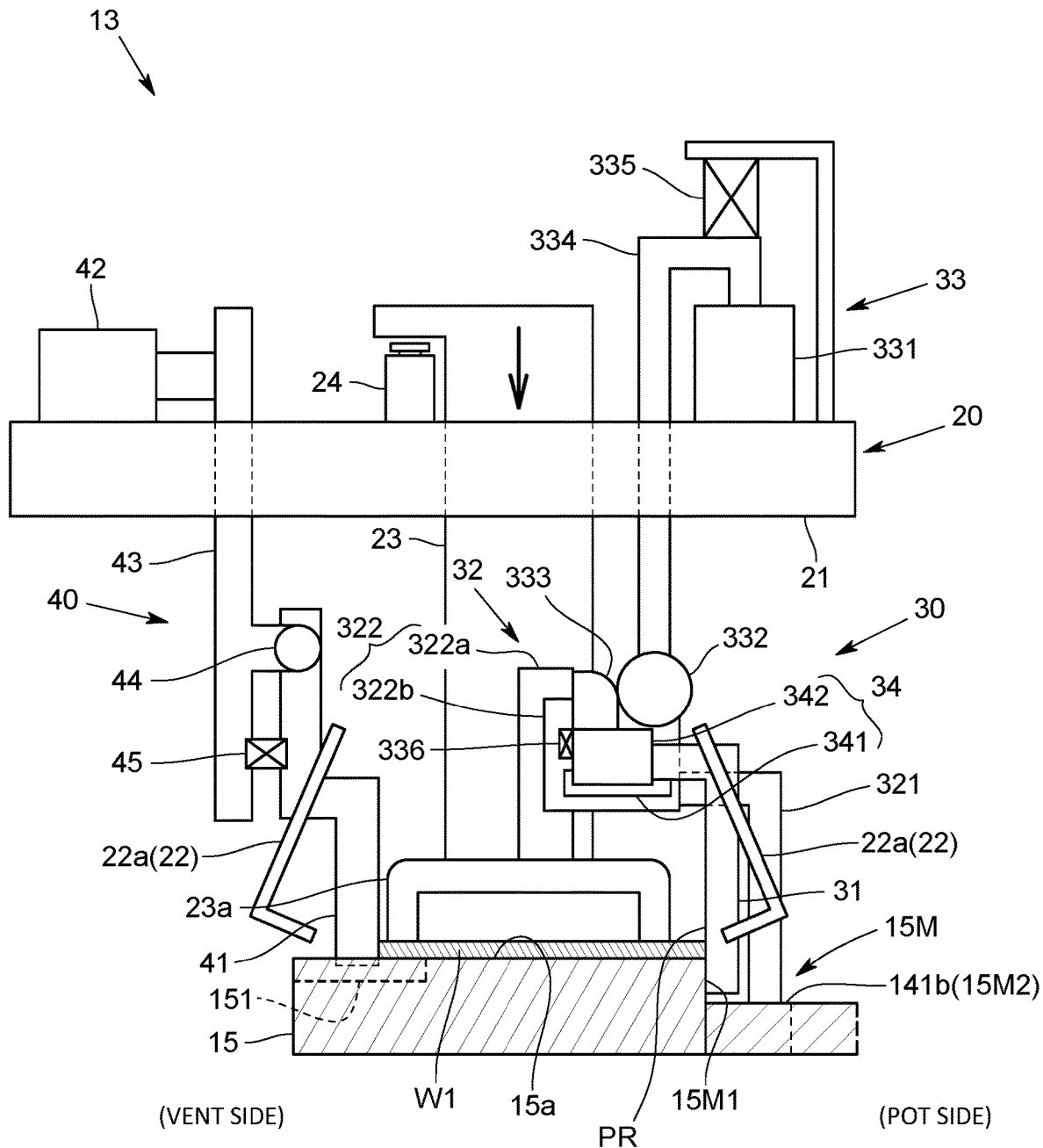
FIG. 15 is a side view schematically illustrating a state where the conveyance apparatus in the same embodiment presses the object to be molded with the pressing member.

Thereafter, as illustrated in FIG. 15, the pressing member 23 is lowered by the up-down moving mechanism 24 to come into contact with and press the outer peripheral edge portion of the object to be molded W1. In this state, the object to be molded W1 is adsorbed and held by the lower molding die 15 by an adsorption mechanism (not illustrated) provided in the lower molding die 15. In the present embodiment, even in a case where the object to be molded W1 is deformed, the object to be molded W1 is pressed by the pressing member 23, so that the object to be molded W1 can be adsorbed and held.

Figure 16:
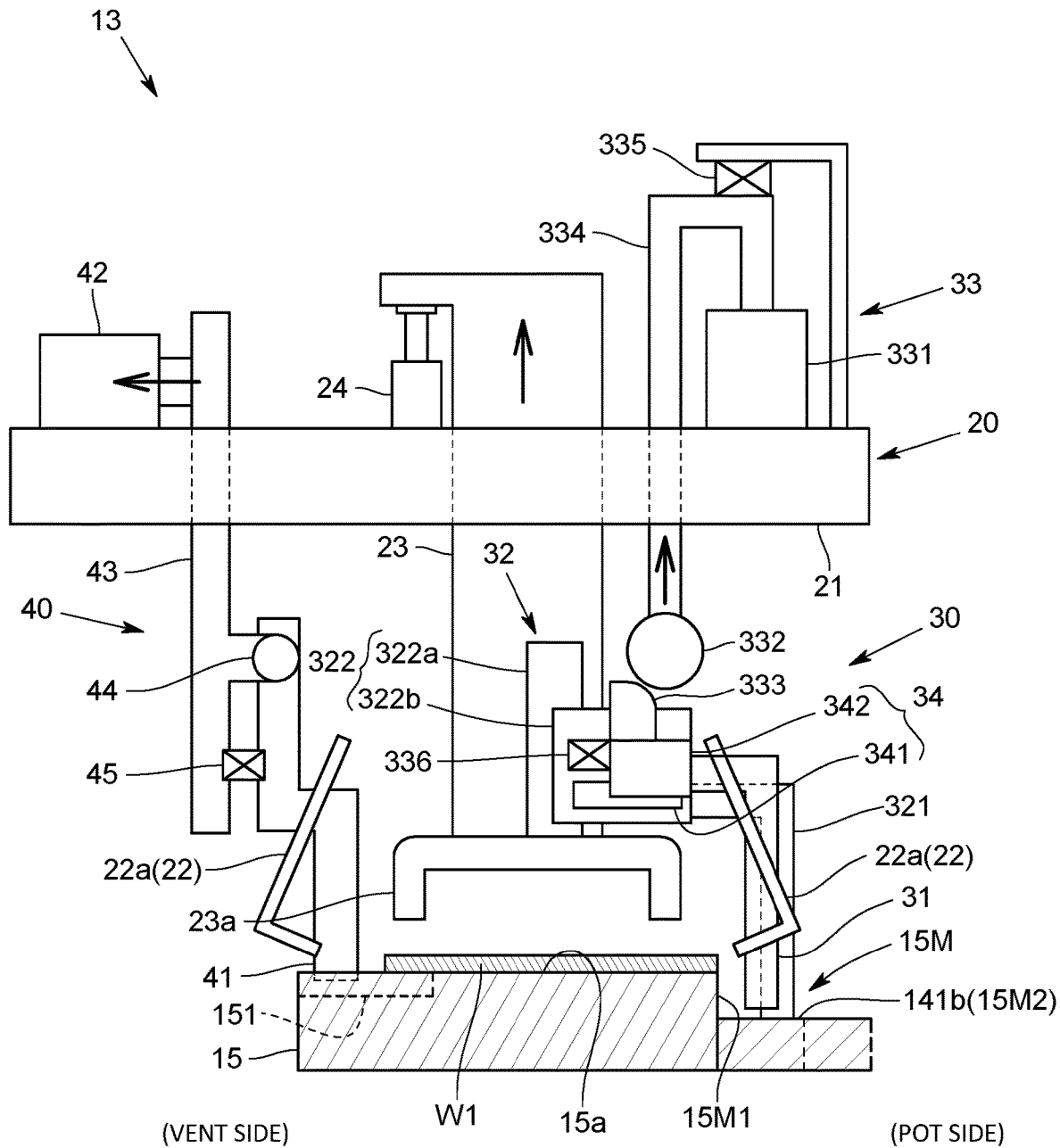
FIG. 16 is a side view schematically illustrating an operation after the conveyance apparatus in the same embodiment completes positioning.

After the adsorption and holding, as illustrated in FIG. 16, the actuator 331 of the position reference mechanism 30 raises the cam driver 332, so that the reference surface member 31 is separated from the side surface 15M1 of the recess 15M. Furthermore, when the object-to-be-molded driving unit 42 of the object-to-be-molded moving mechanism 40 moves the object-to-be-molded contact portion 41 toward the vent side, the object-to-be-molded contact portion 41 is separated from the object to be molded W1. After the series of positioning operations, the resin material J is accommodated in the pot 141a by a resin holding portion provided in the loader 13, and the loader 13 moves to a predetermined standby position.

Effects of Present Embodiment

According to the resin molding apparatus 100 of the present embodiment, after the reference surface member 31 is separated from the bottom surface 15M2 of the recess 15M by the lift mechanism 32, the reference surface moving mechanism 33 moves the reference surface member 31 toward the side surface 15M1 of the recess 15M. Therefore, when the reference surface member 31 is moved to the side surface 15M1 of the recess 15M, the reference surface member 31 can be easily moved, and the reference surface member 31 can be reliably brought into contact with the side surface 15M1 of the recess 15M. Furthermore, since the reference surface member 31 does not come into contact with the bottom surface 15M2 of the recess 15M, it is possible to prevent the conveyance apparatus 13 or the molding die 15 from being scratched or damaged. Specifically, since the lift mechanism 32 is in contact with the upper surface 141b of the pot block 141 to keep the reference surface member 31 away from the upper surface 141b of the pot block 141, the reference surface member 31 can be prevented from being in contact with the upper surface 141b of the pot block 141, and damage of the reference surface member 31 and scratch to the upper surface 141b of the pot block 141 can be prevented.

Furthermore, in the present embodiment, since the lift member 321 is configured to be movable up and down by the up-down moving slide portion 322 with respect to the pressing member 23 of the holding unit 20, the lift member 321 can be brought into contact with the bottom surface 15M2 of the recess 15M (the upper surface 141b of the pot block 141) without accurately determining the vertical position of the lift member 321 by the holding unit 20. That is, even if the holding unit 20 descends after the lift member 321 comes into contact with the bottom surface 15M2 of the recess 15M, the up-down moving slide portion 322 absorbs an amount of descent of the holding unit 20. As a result, the lift member 321 does not excessively push the bottom surface 15M2 of the recess 15M, and the lift member 321 or the upper surface 141b of the pot block 141 can be prevented from being scratched or damaged.

Other Modified Embodiments

Note that the present invention is not limited to the above embodiment.

For example, in the above embodiment, the reference surface member 31 linearly moves along the horizontal direction with respect to the side surface 15M1 of the recess 15M, but may linearly move from a direction inclined with respect to the side surface 15M1 of the recess 15M.

Furthermore, in addition to the configuration in which the reference surface member 31 linearly moves with respect to the side surface 15M1 of the recess 15M, the reference surface member may be configured to rotationally move with respect to the side surface 15M1 of the recess 15M. In this case, for example, it is conceivable that the reference surface member 31 is configured to rotate around a rotation axis provided in the pressing member 23 or the base member 21. Even with this configuration, the lift mechanism 32 can prevent the reference surface member 31 from contacting the bottom surface 15M2 of the recess 15M.

In the above embodiment, the upper surface 141b of the pot block 141 is positioned below the mold surface 15a of the lower molding die 15 to form the recess 15M. However, regardless of the vertical relationship between the upper surface 141b of the pot block 141 and the mold surface 15a of the lower molding die 15, a recess with which the reference surface member 31 comes into contact may be formed on a side of the mold surface of the lower molding die 15.

The reference surface moving mechanism 33 of the above embodiment has a configuration in which the actuator 331 and the cam driver 332 are provided on the base member 21 and the cam slider 333 is provided on the pressing member 23 to be separated using the cam mechanism, but the actuator 331 and the cam driver 332 may be provided on the pressing member 23. Furthermore, the reference surface moving mechanism 33 may not use a cam mechanism.

Moreover, the conveyance apparatus 13 of the above embodiment has a resin material conveying function of receiving the resin material J from the resin material supply unit 12 and conveying the resin material J to the molding module 100B. However, the conveyance apparatus 13 may not have the resin material conveying function, and a resin material conveying mechanism may be separately provided.

In the above embodiment, the object to be molded W1 is positioned with respect to the lower molding die 15. However, in the case of a configuration in which the object to be molded W1 is held by the upper molding die 16, the object to be molded W1 may be positioned with respect to a recess formed in the upper molding die 16. Furthermore, the pair of molding dies is not limited to the upper molding die and the lower molding die, and may be other molding dies.

The resin molding apparatus of the present invention is not limited to transfer molding, and may be, for example, compression molding.

In addition, the present invention is not limited to the above embodiments, and it goes without saying that various modifications can be made without departing from the gist of the present invention.

INDUSTRIAL APPLICABILITY

According to the present invention, the reference surface member can be reliably brought into contact with the side surface of the recess of the molding die.

The invention claimed is:

1. A conveyance apparatus that conveys an object to be molded to a molding die in which a recess is formed on a side of a mold surface on which the object to be molded is placed, the conveyance apparatus comprising:
a position reference mechanism having a reference surface serving as a positioning reference of the object to be molded placed on the molding die; and
an object-to-be-molded moving mechanism that moves the object to be molded placed on the molding die toward the reference surface,
wherein the position reference mechanism includes
a reference surface member having the reference surface and provided so as to be contactable with a side surface of the recess,
a lift mechanism that comes into contact with a bottom surface of the recess to separate the reference surface member from the bottom surface of the recess, and
a reference surface moving mechanism that moves the reference surface member toward a side surface of the recess while the reference surface member is separated from the bottom surface of the recess by the lift mechanism.

2. The conveyance apparatus according to claim 1, wherein
the molding die includes a pot block formed with a pot in which a resin material is accommodated, and the recess is formed by positioning the pot block below the mold surface, and
the lift mechanism comes into contact with an upper surface of the pot block to separate the reference surface member from the upper surface of the pot block.

3. The conveyance apparatus according to claim 1, further comprising a holding unit that holds the object to be molded, wherein the lift mechanism includes a lift member provided so as to be contactable with the bottom surface of the recess, and an up-down moving slide portion that slides the lift member so as to be moved up and down with respect to the holding unit.

4. The conveyance apparatus according to claim 3, wherein the reference surface member is configured to be movable up and down with respect to the molding die together with the lift member.

5. The conveyance apparatus according to claim 3, wherein a distance along a vertical direction between a lower end of the reference surface member and a lower end of the lift member is smaller than a depth dimension of the recess.

6. The conveyance apparatus according to claim 3, wherein the reference surface member is configured to be horizontally movable with respect to the lift member.

7. The conveyance apparatus according to claim 6, wherein
the up-down moving slide portion includes an up-down moving rail member and an up-down moving slide member that slides the up-down moving rail member, and
the reference surface member is configured to be horizontally movable with respect to the lift member by a horizontal slide portion provided on the up-down moving slide member.

8. The conveyance apparatus according to claim 1, wherein
the reference surface moving mechanism uses a cam mechanism, and includes
a cam driver that moves up and down by an actuator, and
a cam slider that is provided on the reference surface member and horizontally moves in contact with the cam driver.

9. The conveyance apparatus according to claim 1, further comprising a pressing member that presses the object to be molded placed on the molding die toward the molding die,
wherein the reference surface member and the lift mechanism are provided on the pressing member.

10. A resin molding apparatus comprising the conveyance apparatus according to claim 1.

11. A method for manufacturing a resin molded product using the conveyance apparatus according to claim 1, the method for manufacturing a resin molded product comprising:
bringing the reference surface member into contact with the molding die;
moving and positioning the object to be molded placed on the molding die toward the reference surface; and
molding the positioned object to be molded with a resin.

* * * * *